US011667397B2

(12) United States Patent
Gamble et al.

(10) Patent No.: US 11,667,397 B2
(45) Date of Patent: Jun. 6, 2023

(54) SYSTEM AND METHOD OF BLADE-TIP FACILITATED AIRCRAFT CAPTURE

(71) Applicant: Lockheed Martin Corporation, Bethesda, MD (US)

(72) Inventors: Dustin E. Gamble, San Luis Obispo, CA (US); Matthew Curran, Los Osos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 17/582,457

(22) Filed: Jan. 24, 2022

(65) Prior Publication Data
US 2022/0144449 A1 May 12, 2022

Related U.S. Application Data

(63) Continuation of application No. 15/688,037, filed on Aug. 28, 2017, now Pat. No. 11,230,389, which is a
(Continued)

(51) Int. Cl.
*B64F 1/02* (2006.01)
*B64F 1/08* (2006.01)
(Continued)

(52) U.S. Cl.
CPC .............. *B64F 1/029* (2020.01); *B64C 11/46* (2013.01); *B64C 39/024* (2013.01);
(Continued)

(58) Field of Classification Search
CPC ...... B64F 1/08; B64C 2201/182; B64C 27/50
See application file for complete search history.

(56) References Cited

U.S. PATENT DOCUMENTS 4,790,497 A 12/1988 Yoffe
6,264,140 B1 7/2001 McGreer et al.
(Continued)

FOREIGN PATENT DOCUMENTS

CN 102159458 8/2011
CN 104808687 7/2015
(Continued)

OTHER PUBLICATIONS

Office Action from China National Intellectual Property Administration, in China Application No. 2018/10164248.X, dated Oct. 27, 2020.
(Continued)

*Primary Examiner* — Brian M O'Hara
(74) *Attorney, Agent, or Firm* — Baker Botts L.L.P.

(57) ABSTRACT

A method of capturing an aerial vehicle comprises rotating a first blade of the aerial vehicle, the first blade coupled to a hub of the aerial vehicle and having a contour configured to facilitate entanglement of a payload line of a winch system around the aerial vehicle. The method further comprises contacting, by a leading edge of the first blade, the payload line of the winch system and pulling the payload line towards the hub of the aerial vehicle, wherein the payload line is pulled towards the hub as the first blade continues to rotate and wherein continued rotation of the first blade causes the payload line to be tangled around the hub of the aerial vehicle.

15 Claims, 6 Drawing Sheets

Related U.S. Application Data continuation-in-part of application No. 15/444,649, filed on Feb. 28, 2017, now Pat. No. 10,384,782.

(51) Int. Cl.

| | | |
|---|---|---|
| *B64C 11/46* | (2006.01) | |
| *B64C 39/02* | (2023.01) | |
| *B64U 10/25* | (2023.01) | |
| *B64U 30/10* | (2023.01) | |
| *B64U 50/13* | (2023.01) | |
| *B64U 70/30* | (2023.01) | |

(52) U.S. Cl.
CPC .............. *B64F 1/0295* (2020.01); *B64F 1/08* (2013.01); *B64U 10/25* (2023.01); *B64U 30/10* (2023.01); *B64U 50/13* (2023.01); *B64U 70/30* (2023.01)

(56) References Cited

U.S. PATENT DOCUMENTS

| | | | |
|---|---|---|---|
| 6,874,729 B1 | 4/2005 | McDonnell | |
| 7,059,564 B2 | 6/2006 | Dennis | |
| 8,864,069 B2 | 10/2014 | McDonnell | |
| 8,931,730 B2* | 1/2015 | Wang | B64C 27/08 244/17.23 |
| 8,944,373 B2 | 2/2015 | Dickson et al. | |
| 9,359,075 B1 | 6/2016 | Von Flotow et al. | |
| 9,586,683 B1 | 3/2017 | Buchmueller | |
| 10,113,839 B2 | 10/2018 | Sekiya | |
| 10,287,006 B1 | 5/2019 | Beckman | |
| 10,384,782 B2 | 8/2019 | Curran | |
| 2010/0113236 A1 | 1/2010 | Carroll | |
| 2010/0044499 A1* | 2/2010 | Dragan | B64C 1/30 244/17.23 |
| 2012/0232721 A1 | 9/2012 | Engblom | |
| 2016/0059963 A1 | 3/2016 | Burgess et al. | |
| 2016/0144980 A1 | 5/2016 | Kunz et al. | |
| 2016/0244165 A1 | 8/2016 | Patrick et al. | |
| 2017/0043871 A1 | 2/2017 | Takayama et al. | |
| 2017/0158340 A1 | 6/2017 | Von Flotow et al. | |
| 2017/0355461 A1 | 12/2017 | Naito | |
| 2017/0356726 A1* | 12/2017 | Theiss | F41H 13/0006 |
| 2018/0155024 A1 | 6/2018 | Lee | |
| 2018/0244400 A1 | 8/2018 | Gamble | |
| 2018/0335779 A1 | 11/2018 | Fisher | |
| 2018/0354623 A1 | 12/2018 | Bhat | |
| 2019/0112045 A1 | 4/2019 | Zhang | |
| 2019/0210720 A1 | 7/2019 | Beckman | |
| 2020/0102070 A1 | 4/2020 | Lydecker | |

FOREIGN PATENT DOCUMENTS

| | | |
|---|---|---|
| CN | 204998782 | 1/2016 |
| CN | 105658519 | 6/2016 |
| CN | 107097954 | 8/2017 |
| CN | 207157480 | 3/2018 |
| CN | 207424603 | 5/2018 |
| JP | 4-53790 | 5/1992 |
| WO | WO 2014/133400 A1 | 9/2014 |
| WO | WO 2015/076886 A2 | 5/2015 |
| WO | WO 2016/149198 A1 | 9/2016 |

OTHER PUBLICATIONS

Examination Report in European Application No. 18 158 338.6-1202, dated Jul. 27, 2020.
Taiwan Office Action in TW Application No. 107106538, reported Jan. 13, 2020 (translated), dated Jan. 13, 2020.
China National Intellectual Property Administration, Rejection Decision, Application No. 201810164248.X (English translation included), dated May 7, 2021.
Chinese National Intellectual Property Administration Office Action and Search Report in Chinese Application No. 201810164248.X, dated Mar. 13, 2020.
European Office Action in EP Application No. 18 158 338.6-1202, dated Mar. 9, 2020.

* cited by examiner

SYSTEM AND METHOD OF BLADE-TIP FACILITATED AIRCRAFT CAPTURE

RELATED APPLICATION

This application is a continuation application of U.S. application Ser. No. 15/688,037 filed Aug. 28, 2017 entitled "System and Method of Blade-Tip Facilitated Aircraft Capture," which is a continuation-in-part of U.S. patent application Ser. No. 15/444,649 entitled "Airborne Payload Control System" which was filed on Feb. 28, 2017, now issued as U.S. Pat. No. 10,384,782 dated Aug. 8, 2019, the contents of which are herein incorporated by reference in their entirety.

TECHNICAL FIELD

This disclosure relates in general to aircraft capture of aircraft and more particularly to a system and method of blade-tip facilitated aircraft capture.

BACKGROUND

The ability for a moving aircraft to control the position of a payload in space may enable a variety of missions. As an example, such an ability would enable a moving aircraft to recover a mobile payload such as an aerial vehicle. It may be desirable to recover or otherwise retrieve a mobile aerial vehicle in the event that the aerial vehicle does not have the power or battery life to travel to its final destination.

SUMMARY OF THE DISCLOSURE

According to one embodiment, a method of capturing an aerial vehicle comprises rotating a first blade of the aerial vehicle, the first blade coupled to a hub of the aerial vehicle and having a contour configured to facilitate entanglement of a payload line of a winch system around the aerial vehicle. The method further comprises contacting, by a leading edge of the first blade, the payload line of the winch system and pulling the payload line towards the hub of the aerial vehicle, wherein the payload line is pulled towards the hub as the first blade continues to rotate and wherein continued rotation of the first blade causes the payload line to be tangled around the hub of the aerial vehicle.

Technical advantages of certain embodiments may include capturing and retrieving an airborne aerial vehicle. Additionally, certain embodiments may provide controlled retrieval of a mobile payload. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 9, where like numbers are used to indicate like and corresponding parts.

This disclosure recognizes using an integrated systems approach to payload release and retrieval. Such approach may permit fixed-wing aircraft to exert helicopter-like control over a payload line. The approach may also permit autonomous unmanned aircraft to hold a payload stationary during flight. Integrating multiple systems for payload release and retrieval as described herein may permit the airborne payload control system to stabilize and control the end of a payload line in both position and altitude.

Figures 1, 3:
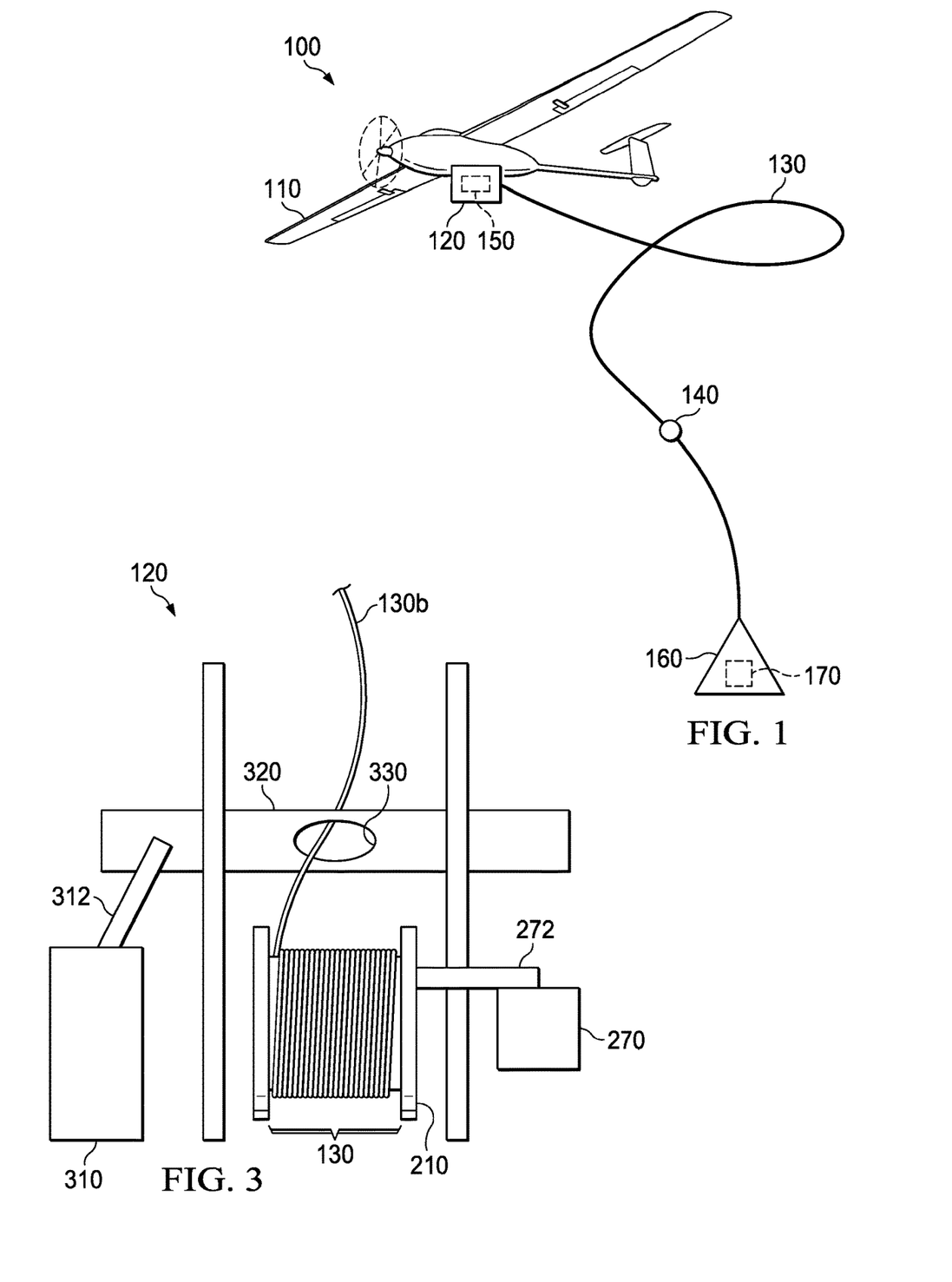
FIG. 1 illustrates an airborne payload control system, according to certain embodiments.
FIG. 3 illustrates a rear view of the example winch system of FIG. 2.

FIG. 1 illustrates an airborne payload control system 100 operable to maintain the position and altitude of the end of a payload line. Airborne payload control system 100 may, in some embodiments, include an aircraft 110, a winch system 120, a payload line 130, a line sensor 140, and one or more controllers 150. One or more components of airborne payload control system 100 may be communicably coupled to ensure control over payload line 130, which may then be used to release, retrieve, and/or transport payload 160.

Aircraft 110 may be any vehicle operable to fly in the air. In some embodiments, aircraft 110 is an unmanned aerial vehicle ("UAV") that does not require manned operation of aircraft 110. Aircraft 110 may also be any fixed-wing aircraft such as an airplane. This disclosure recognizes that aircraft 110 may, in some embodiments, transport payload 160. In some embodiments, payload 160 is transported within a fuselage of aircraft 110. In other embodiments, payload 160 may be transported via payload line 130. As an example, payload 160 may be coupled to an end of payload line 130 and may be reeled into or out of aircraft 110.

Aircraft 110 may include an onboard avionics system. In some embodiments, features of the onboard avionic system may be controlled by one or more controllers (e.g., controller 150 of FIG. 1). For example, in response to receiving instructions from controller 150, the onboard avionic system may adjust or maintain one or more of the flight path, speed, orbit, and/or altitude of aircraft 110. In some embodiments, controller 150 instructs the onboard avionics system to adjust or maintain one or more of the flight path, speed, orbit, and/or altitude of aircraft 110 in order to control a position and/or altitude of the end of payload line 130. By controlling the position and/or altitude of the end of payload line 130, the position and/or altitude of payload 160 may be controlled.

Maintaining control over payload 160 may enable various missions such as the controlled retrieval of a stationary or mobile payload. As another example, maintaining control over payload 160 may enable controlled release of payloads (e.g., careful placement of fragile payloads on the ground). As yet another example, maintaining control over payload 160 may enable inconspicuous data retrieval (e.g., holding a payload such as a sensor or camera above the ground while the aircraft flies at an altitude that is visually and acoustically undetectable).

As described above, airborne payload control system 100 may also include winch system 120 and payload line 130. Winch system 120 may, in some embodiments, be located aboard aircraft 110 (e.g., in fuselage of aircraft 110). In other embodiments, winch system 120 is coupled to an exterior wall of aircraft 110. For example, as depicted in FIG. 1, winch system 120 is coupled to the underside of aircraft 110. Winch system 120 may be operable to spool payload line 130. Accordingly, winch system 120 is the component of airborne payload control system 100 that is responsible for reeling in and reeling out payload line 130. In some embodiments, a first end 130a of payload line 130 is coupled to winch system 120 and a second end 130b of payload line 130 is not coupled to winch system 120. As an example, first end 130a of payload line 130 may be secured to main reel 210 and second end 130b of payload line 130 may initially be wound about main reel 210 and thereafter be reeled towards or away from aircraft 110. Additional details of winch system 120 are described below in reference to FIG. 2.

Second end 130b of payload line 130 may be operable to couple to payload 160. In some embodiments, payload 160 is coupled to second end 130b of payload line 130 using a coupling mechanism (not depicted). In some embodiments, coupling mechanism is a magnet, a hook, or a suction cup. Although this disclosure describes particular types of coupling mechanisms, this disclosure recognizes any suitable coupling mechanism operable to couple payload 160. In other embodiments, payload 160 is coupled to second end 130b of payload line 130 without the aid of an additional component. As an example, second end 130b of payload line 130 may be configured to couple to a moving payload 160 such as the weight-shifting coaxial helicopter described in U.S. application Ser. No. 15/085,540 and incorporated by reference herein. In such an example, the weight-shifting coaxial helicopter may fly into or near the second end 130b of payload line 130, causing payload line 130 to get tangled on or between the blades of weight-shifting coaxial helicopter. As a result, the weight-shifting coaxial helicopter is secured or otherwise coupled to second end 130b of payload line 130. The capture and retrieval of aircraft will be described in more detail below in reference to FIGS. 6-8.

Payload line 130 may comprise any suitable material. For example, payload line 130 may comprise monofilament or braided, synthetic or non-synthetic rope, string, twine, or fishing line. Preferably, payload line 130 comprises a material that has the desired tensile strength, diameter, drag, and shape memory.

Airborne payload control system 100 may also include line sensor 140 as described above. In some embodiments, line sensor 140 is positioned on payload line 130. Line sensor 140 may be operable to detect information about payload line 130. For example, line sensor 140 may be operable to detect information about one or more of a position of the payload line (e.g., a position in space of second end 130b of payload line 130), a velocity of the payload line (e.g., a velocity of second end 130b of payload line 130), and an altitude of second end 130b of payload line 130. Although this disclosure describes certain types of information that may be detected by line sensor 140, this disclosure recognizes that line sensor 140 may detect any suitable information. As used herein, suitable information that may be detected by line sensor 140 includes any information that may be utilized by one or more controllers 150 of airborne payload system 150. In some embodiments, the information detected by line sensor 140 is relayed to other components of airborne payload control system 100 (e.g., via RF signal). As an example, the information detected by line sensor 140 may be sent to one or more controllers 150 of airborne payload control system 100. In some embodiments, controllers 150 may provide instructions to aircraft 110 and/or winch system 120 based on the information detected by line sensor 140. For example, in response to line sensor 140 detecting that the velocity of second end 130b of payload line 130 is increasing in a downward direction, one or more controllers 150 of airborne payload system 100 may instruct winch system 120 to reel in payload line 130 at a rate of speed to correct the downward motion. As another example, in response to line sensor 140 detecting that the altitude of second line 130b of payload line 130 is decreasing, one or more controllers 150 of airborne payload system 100 may instruct aircraft 110 to increase the altitude of aircraft 110 to maintain the desired altitude of second end 130b of payload line 130.

Line sensor 140 may detect information about payload line 130 continuously or periodically. For example, line sensor 140 may continuously detect information about payload line 130 and make such real-time information available to one or more components of airborne payload control system 100. As another example, line sensor 140 may detect information about payload line 130 periodically (e.g., every one second). In a preferred embodiment, line sensor 140 detects and relays real-time information. This disclosure recognizes that control over payload line 130 and/or payload 160 is more precise when real-time information is detected as compared to using periodic information.

In some embodiments, line sensor 140 is under the direction and/or control of controller 150. For example, controller 150 may control the operation of line sensor 140. In such an embodiment, controller 150 may instruct line sensor 140 when to begin detecting information about payload line 130. As an example, controller 150 may instruct line sensor 140 to begin detecting information about payload line 130 when payload 160 is a particular distance from aircraft 110. Controller 150 may also instruct line sensor when, or with what component, to share the detected information. As an example, controller 150 may instruct line sensor 140 to continuously share real-time information with a data link associated with winch system 120.

Airborne payload control system 100 may also include one or more controllers 150 as described above. As illustrated in FIG. 1, airborne payload control system 100 includes a single controller 150. This disclosure recognizes that one or more components of airborne payload control system 100 may include a controller 150. As an example, aircraft 110 may be associated with a first controller 150 and winch system 120 may be associated with a second controller 150. In such an example, the first controller 150 and the second controller 150 may be configured to receive data from one or more other components of airborne payload control system 100. For example, the first controller 150 and the second controller 150 may receive information about payload line 130 from line sensor 140 and may receive information about payload 160 from tracking and control system 170. In some embodiments, the one or more controllers 150 may be configured to exchange information with one another (e.g., the first controller relays information about the aircraft's position, flight path, speed, orbit, and altitude to the second controller). In other embodiments, aircraft 110 and/or winch system 120 may be associated with a data link which is configured to share data with the one or more controllers 150.

In some embodiments, controller 150 includes or is a computer system such as computer system 600 described below in reference to FIG. 9. Controller 150 may be operable to receive information from one or more of line sensor 140 and tracking and control system 170 and provide operation instructions to one or more of aircraft 110 and winch system 120. In some embodiments, the one or more controllers 150 are configured to analyze the received information and compute various factors that may stabilize the second end 130b of payload line 130. For example, controllers 150 may compute factors such as optimal headings, flight paths, flight speeds, reel speeds, reel directions, payload line lengths, and payload line tensions. In some embodiments, the logic used to compute such factors is stored in a memory of controller 150 (e.g., memory 920 of FIG. 9).

Airborne payload control system 100 may also include other components such as a tracking and control system 170 for payload 160. The tracking and control system 170 of payload 160 may be configured to sense information about the position or location of payload 160 and relay the sensed information to other components of airborne payload control system 100. As an example, tracking and control system 170 may send information about the location and position of payload 160 to controllers 150 of airborne payload control system 100. Airborne payload control system 100 may in turn use this information to instruct aircraft 110 and/or winch system 120. Although this disclosure describes and depicts airborne payload control system 100 including certain components, airborne payload control system 100 may include any suitable components. For example, this disclosure recognizes that airborne payload control system 100 may include components and features that may be used in conjunction with tracking, control, and transport of payloads.

In operation, winch system 120, under direction from controller 150, may reel payload line 130 out in anticipation of retrieving or releasing payload 160. As an example, winch system 120 may begin reeling out payload line 130 in response to receiving an instruction from controller 150 to increase the length of payload line 150 by 300 feet. In some embodiments, controller 150 sends such instruction to winch system 120 after determining that a payload 160 requiring pick-up is one mile away. This determination may be based on information received from tracking and control system 170 of payload 160. After winch system 120 reels out payload line 130 in accordance with the instructions from controller 150, controller 150 may begin receiving data from line sensor 140 about payload line 130. As an example, controller 150 may receive the following information from line sensor: 3D velocity components (e.g., Vnorth, Veast, Vdown) and 3D position components (e.g., latitude, longitude, altitude). In addition receiving information from line sensor 140, controller 150 may also receive, or continue to receive, information from tracking and control system 170 of payload 170. For example, controller 150 may receive the following information from tracking and control system 170: 3D velocity components (e.g., Vnorth, Veast, Vdown) and 3D position components (e.g., latitude, longitude, altitude). Controller 150 may use the received information to provide operation instructions to one or more of aircraft 110 and winch system 120. As an example, based on the information received by controller 150, controller 150 may instruct winch system to adjust the length of payload line 130. As another example, controller 150 may instruct aircraft 110 to adjust the flight path of aircraft 110. In some embodiments, controller 150 facilitates the operation of aircraft 110 by providing instructions to the onboard avionics system. In some embodiments, controller 150 facilitates the operation of winch system 120 by providing instructions to one or more components of winch system 120 (e.g., first motor 220, second motor 240, etc.). Controller 150 may use the real-time information received from one or more of line sensor 140 and tracking and control system 170 to compute various factors such as optimal headings, flight paths, flight speeds, reel speeds, reel directions, payload line lengths, and payload line tension. Controller 170 may then instruct one or more of aircraft 110 and winch system 120 to make operational adjustments based on the computations. For example, controller 150 may instruct aircraft 110 to change its flight path based on computations. As another example, controller 150 may instruct winch system 120 to increase tension on payload line 130 based on the computations. In some embodiments, implementing the instructions of controller 150 stabilizes the second end 130a of payload line 130. For example, implementing the instructions of controller 150 may permit the second end 130a of payload line 130 to maintain a particular altitude (e.g., 1000 feet MSL) and a particular position (e.g., Latitude 35.3 degrees north, Longitude 120.8 degrees west) as aircraft 110 continues to fly through the air.

Figure 2:
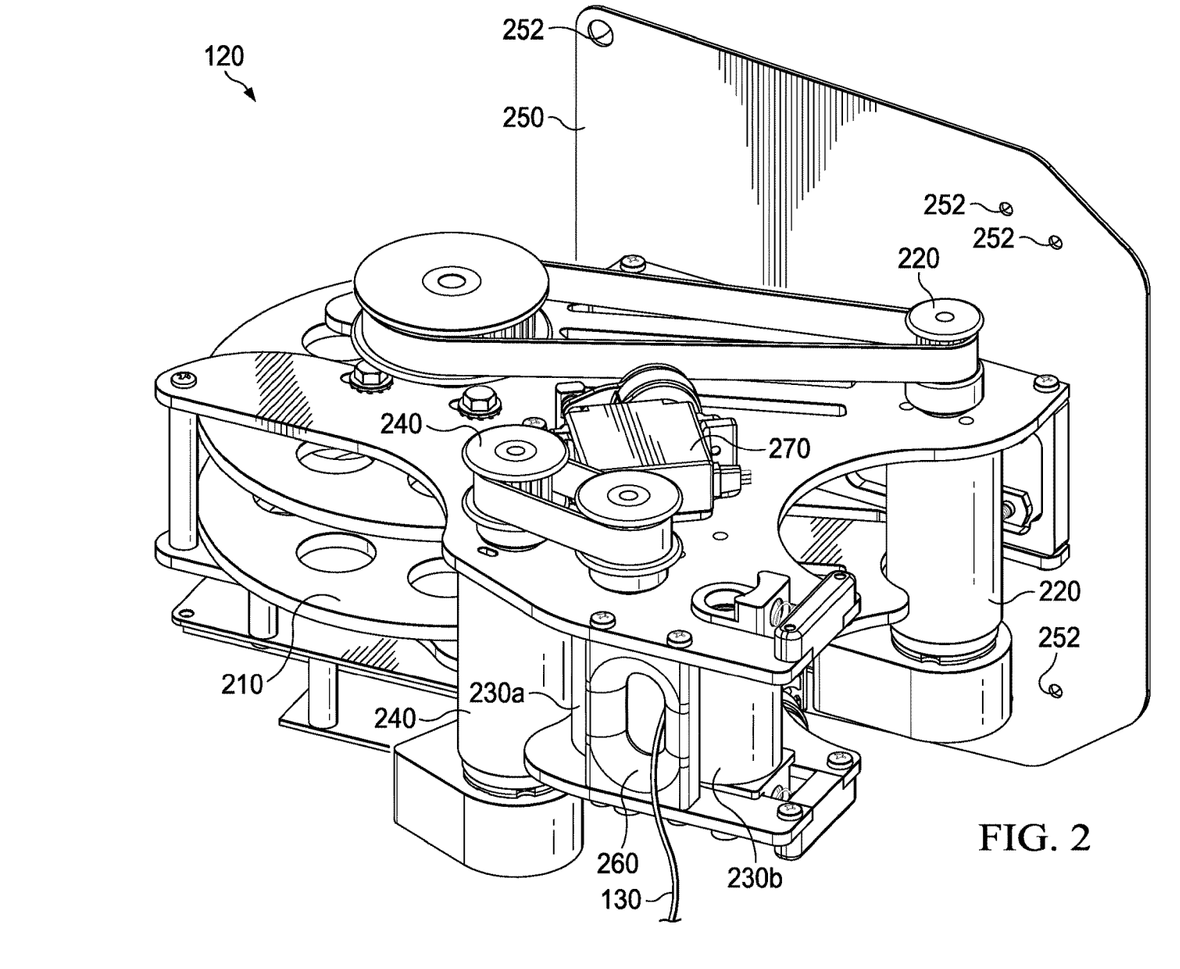
FIG. 2 illustrates a perspective view of an example winch system of the airborne payload control system of FIG. 1, according to certain embodiments.

Turning now to FIG. 2, winch system 120 may comprise a main reel 210, a first motor 220, a set of pinch rollers 230 (i.e., 230a-b), and a second motor 240. As described above, winch system 120 is the component responsible for reeling payload line 130 in and out. As used herein, reeling payload line 130 out refers to increasing the length of payload line 130 extending from aircraft 110, and reeling payload line 130 in refers to decreasing the length of payload line 130 extending from aircraft 110. Main reel 210 may be a spool about which payload line 130 is wound. As described above, payload line 130 may be coupled to main reel 210 at a first end 130a and all or a portion of payload line 130 may be wound about main reel 210. Second end 130b of payload line 130 may be configured to be spooled onto and off of main reel 210. This is best illustrated in FIG. 3 wherein payload line 130 is wound about main reel 110 and second end 130b of payload line 130 is threaded through an aperture 330 in shaft 320.

In some embodiments, payload line 130 is spooled onto and off of main reel 210 by turning main reel 210. For example, turning main reel 210 in a first direction may feed payload line 130 out and turning main reel 210 in a second direction may reel payload line 130 in. In some embodiments, first motor 220 is operable to turn main reel 210 in both the first and the second direction. First motor 220 may receive instructions to turn main reel 210 from one or more controllers of airborne payload control system 100. As an example, controller 150 of FIG. 1 may send instructions to first motor 220 to turn main reel 210 in the first direction and, in response, first motor 220 may turn main reel 210 in the first direction.

As described above, winch system 120 may include pinch rollers 230. In some embodiments, payload line 130 may be threaded between first pinch roller 230*a* and second pinch roller 230*b*. Pinch rollers 230 may be configured to maintain tension on payload line 130. In some embodiments, tension on payload line 130 is maintained by keeping payload line taught between main reel 210 and pinch rollers 230. This may be achieved by turning pinch rollers 230 in the first and/or second direction. In some embodiments, one or more pinch rollers 230 are rotated by second motor 240.

Second motor 240 may be configured to turn one or more pinch rollers 230. For example, second motor 240 may be configured to turn first pinch roller 230*a* but not second pinch roller 230*b*. Second motor 240 may be configured to turn one or more pinch rollers 230 in the first direction and/or the second direction. In some embodiments, second motor 240 receives instructions from one or more controllers of airborne payload control system 100. For example, controller 150 of FIG. 1 may send instructions to second motor 240 to turn first pinch roller 230*a* in the first direction and, in response, second motor 240 may turn first pinch roller 230*a* in the first direction.

In some embodiments, one or more controllers of airborne payload control system 100 may send instructions to one or more of first motor 220 and second motor 240. For example, in response to determining to feed payload line 130 out, controller 150 of FIG. 1 may instruct second motor 240 to turn one or more pinch rollers 230 in the first direction (to feed payload line 130 out). As another example, in response to determining to feed payload line 130 in, controller 150 of FIG. 1 may instruct first motor 230 to turn main reel 210 in the second direction (to reel payload line 130 in). In addition to instructing motors 220 and 240 regarding directions of turning, controller(s) 150 may instruct motors 220 and 240 to turn main reel 210 and pinch rollers 230, respectively, at particular rates. In some embodiments, such instructions may enable controller 150 to control the speed and/or length of payload line 130 and/or tension on payload line 130.

Controller(s) 150 may send instructions to first motor 220 and second motor 240 that enable main reel 210 and pinch rollers 230 to cooperate to feed payload line 130 in and out. For example, in response to determining to feed payload line 130 in, controller 150 of FIG. 1 may instruct first motor 230 to turn main reel 210 in the second direction and instruct second motor 220 to apply a braking function. As another example, in response to determining to feed payload line 130 out, controller 150 of FIG. 1 may instruct second motor 240 to turn one or more pinch rollers 230 in the second direction and instruct first motor 220 to apply a braking function. Such instructions may permit payload line 130 to be reeled in and out while also keeping payload line 130 taught between main reel 210 and pinch roller 230 thus preventing payload line 130 from tangling (e.g., as may occur when reeling in payload line 130 at high speeds and not keeping payload line 130 taught). In some embodiments, the instructions of controller(s) 150 to first motor 220 and/or second motor 240 may permit winch system 120 to maintain second end 130*b* of payload line 130 in a particular position (e.g., latitude, longitude, and altitude).

Each of motors 220 and 240 may be associated with one or more optical encoders (not illustrated). The one or more optical encoders may be configured to detect information about payload line 130 and relay the information to one or more controllers of airborne payload control system 100 (e.g., controller 150). As an example, the information detected by an optical encoder may be used to determine the length of payload line 130 on main reel 210. Such information may in turn be used by controller 150 to provide instructions to one or more components of airborne payload control system 100 (e.g., first motor 220, second motor 240, etc.). For example, in response to determining, based on information from an optical encoder associated with first motor 220, that payload line 130 on main reel 210 is nearly empty, controller 150 sends instructions to reduce the speed of second motor 240 while reeling out payload line 130.

As described above, instructions from controller(s) 150 may be based on information received from line sensor 140. For example, in response to receiving information from line sensor 140, controller 150 may send instructions to one or more of first motor 220 and second motor 240. In this manner, controller(s) 150 may use feedback from line sensor 140 to control the distance, velocity, acceleration, and/or jerk on payload line 130. In some embodiments, the distance, velocity, acceleration, and/or jerk of payload line 130 is controlled to maintain a particular position (e.g., latitude, longitude, and altitude) of second end 130*b* of payload line 130 during the flight of aircraft 110.

In some embodiments, winch system 120 includes additional components. For example, as illustrated in FIG. 2, winch system 120 includes a mounting plate 250. Mounting plate 250 may be configured to mount winch system 120 to aircraft 110. In some embodiments, mounting plate 250 includes apertures 252 configured to receive fasteners therethrough. Fasteners may be used to couple winch system 120 to aircraft 110. Winch system 120 may also include an eye 260. In some embodiments, eye 260 is a plate comprising an aperture through which second end 130*b* of payload line 130 is threaded. Eye 260 may be configured to restrict movement of payload line 130. This may be desirable to limit movement of payload line 130 as it is reeled in and out by winch system 120.

Winch system 120 may also include one or more servo motors (e.g., servo motors 270 and 310) that provide additional functionality. Servo motors 270 and 310 and the functionality they provide are best illustrated in FIG. 3. Servo motor 270 may be operable to move a locking bar 272 from a first position to a second position. In some embodiments, main reel 210 may be turned in the first or the second direction when locking bar 272 is in the first position (unlocked position) and main reel 210 may be prevented from turning when locking bar 272 is in the second position (locked position). In some embodiments, servo motor 270 is configured to receive instructions from one or more controllers of airborne payload control system 100 (e.g., controller 150 of FIG. 1) and move locking bar 272 from the first position to the second position (or from the second position to the first position) upon receiving instructions to do so. As an example, upon receiving instructions from controller 150 to move locking bar 272 into the second position, servo motor 170 may push locking bar 272 into main reel 210, thereby preventing main reel 210 from turning.

FIG. 3 also illustrates servo motor 310. Servo motor 310 may be operable to move shaft 320. As an example, servo motor 310 may be operable to move shaft 320 from a first position to a second position. As described above, shaft 320 may include aperture 330 through which second end 130*b* of payload line 130 is threaded. In some embodiments, moving shaft 320 from the first position to the second position causes payload line 130 to be distributed in a substantially even manner on main reel 210. As used herein, distributing payload line 130 in a "substantially even manner" prevents payload line 130 from being lumped on the sides or in the center of main reel 210. This disclosure recognizes certain benefits of distributing payload line 130 in a substantially even manner across main reel 210. For example, such distribution may reduce the likelihood of tangles, catches, and/or snags. Although this disclosure describes and depicts winch system 120 comprising particular components, this disclosure recognizes that winch system 120 may comprise any suitable component.

This disclosure also contemplates a line cutting feature of winch system 120. In some embodiments, this line cutting feature is performed using components described herein. Such feature may be performed at the direction of controller(s) 150. For example, controller 150 may instruct servo motor 170 to move locking bar 272 into the locked position and, after locking bar 272 is positioned in the locked position, instruct second motor 240 to begin feeding line out, thus causing a friction cut of payload line 130.

Figure 4:
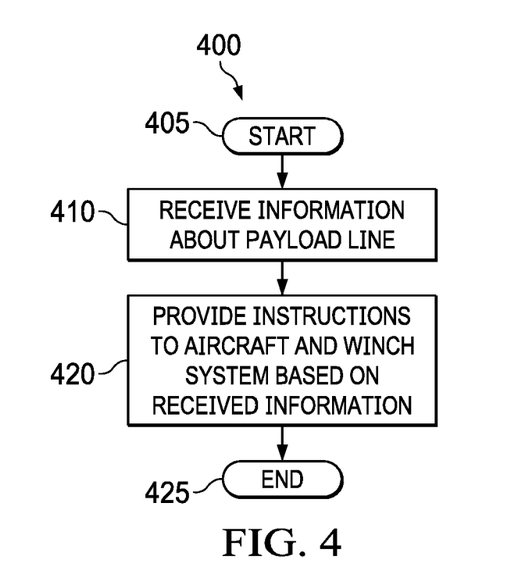
FIG. 4 illustrates a method of operation for the airborne payload control system of FIG. 1, according to one embodiment.

FIG. 4 illustrates a method 400 of operation for airborne payload control system 100. Method 400 may be performed by one or more controllers of airborne payload control system 100. As an example, controller 150 of FIG. 1 may perform method 400. As described above, a controller operable to perform method 400 may be a computer such as computer 900 of FIG. 9. Method 400 may be stored in a memory of controller (e.g., memory 920 of FIG. 9).

Method 400 may begin in step 405 and proceed to step 410. At step 410, controller 150 may receive information about payload line 130. As described above, controller 150 may receive information about payload line 130 from line sensor 140. The information received by controller 150 may comprise one or more of: a position of payload line 130; a velocity of payload line 130; and an altitude of second end 130b of the payload line 130. Although this disclosure recognizes particular types of information that may be sensed by line sensor 140, this disclosure recognizes that line sensor 140 may detect any suitable information (e.g., information that would be helpful in maintaining a position of second end 130b of payload line 130). In some embodiments, after receiving information about payload line 130, method 400 proceeds to step 420.

At step 420, controller 150 provides instructions to aircraft 110 and winch system 120 based on information received at step 410. In some embodiments, the instructions provided by controller 150 at step 420 cause a position of second end 130b of payload line 130 to be maintained. As described above, controller 150 may provide instructions to an onboard avionic system operable to control one or more of the flight path, speed, orbit, and/or altitude of aircraft 110. Controller 150 may also provide instructions to one or more of first motor 220 and/or second motor 240. As described above, instructions to first motor 220 may include instructions regarding one or more of a direction of turning main reel 210, a speed at which to turn main reel 210, a tension on payload line 130, and an application of a braking functionality. Instructions to second motor 220 may include instructions regarding one or more of a direction of turning one or more pinch rollers 130, a speed of turning one or more pinch rollers 130, a tension on payload line 130, and an application of a braking functionality. Controller 150 may also provide instructions to one or more servo motors of winch system 120. For example, controller 150 may instruct servo motor 270 to move locking bar 272 from a first position to a second position. As another example, controller 150 may instruct servo motor 310 to move shaft 320 from a first position to a second position. In some embodiments, after performing step 420, method 400 proceeds to an end step 425.

Figure 5:
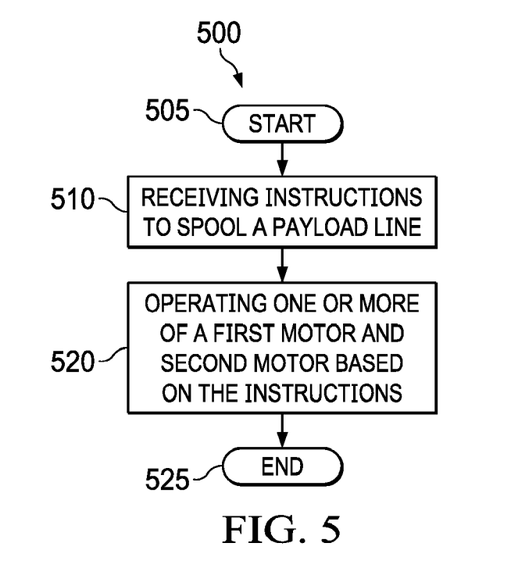
FIG. 5 illustrates a method of operation for the winch system of FIG. 2, according to one embodiment.
Figure 6A:
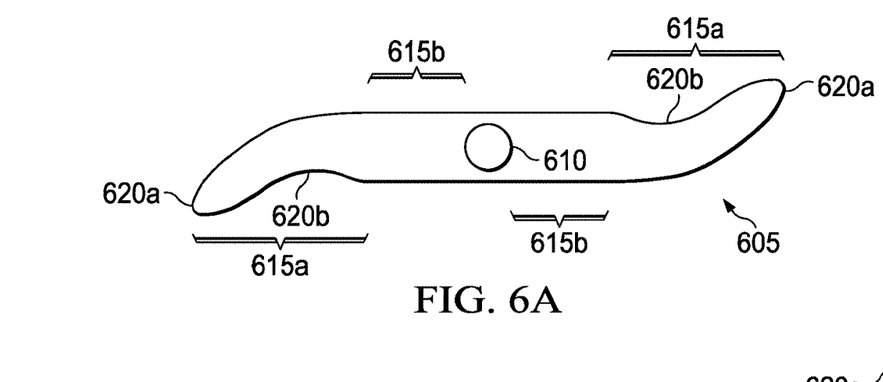
FIGS. 6A-6D illustrate examples of blade contours that may facilitate entanglement and capture of an aircraft by the winch system of FIG. 2, according to certain embodiments.
Figure 6B:
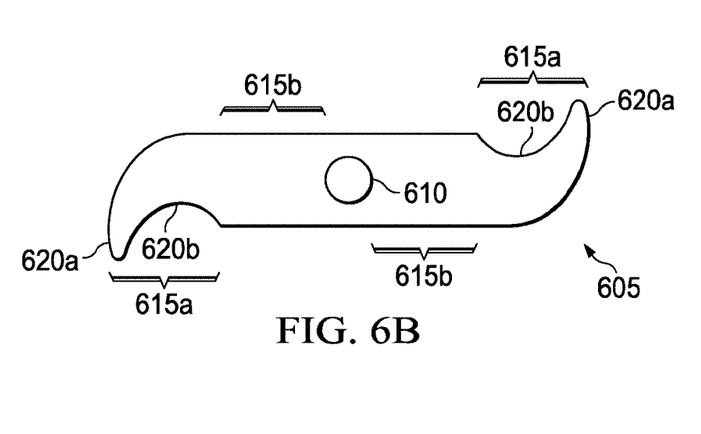
Figure 6C:
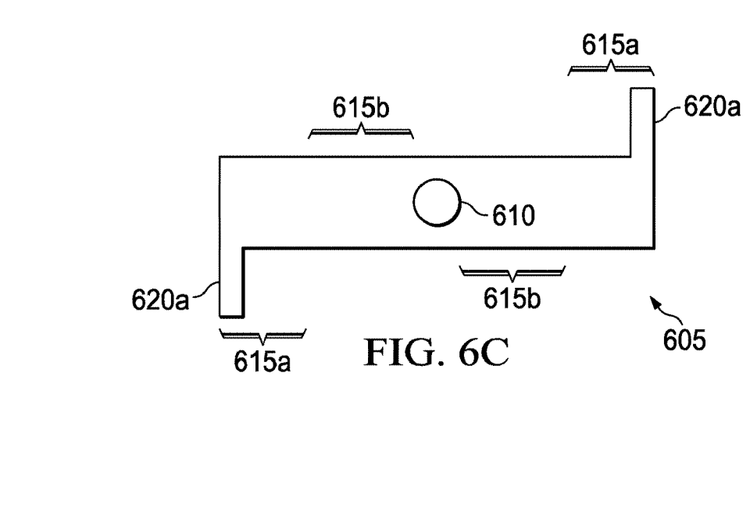
Figure 6D:
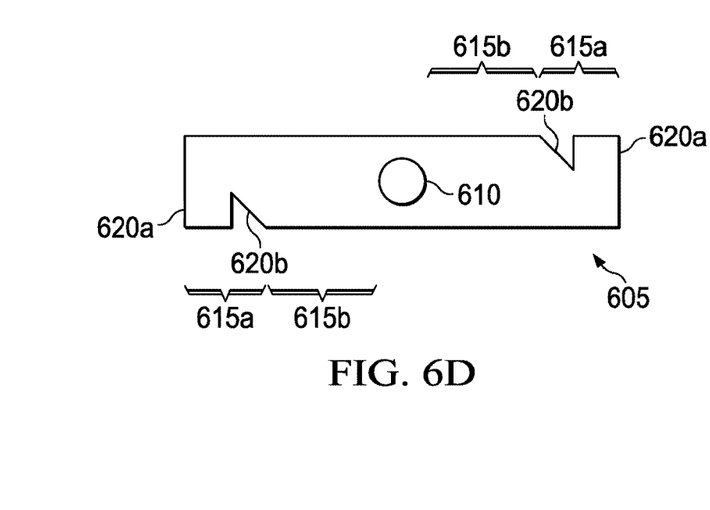

FIG. 5 illustrates a method 500 of operation for winch system 120. Method 500 may be performed by one or more controllers of airborne payload control system 100. As an example, controller 150 of FIG. 1 may perform method 500. As described above, a controller operable to perform method 500 may be a computer such as computer 900 of FIG. 9. Method 500 may be stored in a memory of controller (e.g., memory 920 of FIG. 9).

Method 500 may begin in step 505 and proceed to step 510. At step 510, one or more of first motor 220 and second motor 240 receives instructions to spool payload line 130. In some embodiments, the received instructions instruct first motor 220 and/or second motor 240 to spool payload line 130 in or out. As described above, payload line 130 may be spooled out by turning one or more of main reel 210 and/or pinch rollers 130 in the first direction and payload line 130 may be spooled in by turning one or more of main reel 210 and/or pinch rollers 130 in the second direction.

In some embodiments, payload line 130 is spooled out by instructing first motor 220 to perform a braking function and instructing second motor 240 to turn in the first direction. In some other embodiments, payload line 130 is spooled in by instructing first motor 220 to turn in the second direction and instructing second motor 240 to apply a braking function. In some embodiments, the received instructions instruct first motor 220 and/or second motor 240 to operate at a particular speed. In other embodiments, the received instructions instruct first motor 220 and/or second motor 240 to pull payload line 130 taught. Although this disclosure describes particular types of instructions that may be received from one or more controllers of airborne payload control system 100, this disclosure recognizes that the received instructions may include any suitable information that may enable winch system 120 to control the position of second end 130b of payload line 130. In some embodiments, after first motor 220 and/or second motor 240 receives instructions to spool payload line 130, the method 500 proceeds to step 520.

At step 520, first motor 220 and/or second motor 240 operate based on the instructions received at step 510. For example, first motor 220 may apply a braking function in response to receiving an instruction to perform a braking function. As another example, second motor 240 may begin turning pinch roller 230a at a particular rate (e.g., 150 rpm) in the first direction in order to increase the length of payload line 130. The instructions may be implemented serially or simultaneously. In some embodiments, implementing the instructions received at step 510 cause the position of second end 130b of payload line 130 (e.g., latitude, longitude, and altitude) to be maintained.

The descriptions below of FIGS. 6-8 generally describe the capture and retrieval of aircraft and aerial vehicles. In some embodiments, the aircraft and/or aerial vehicles are captured and retrieved by airborne payload control system 100. Generally, FIGS. 6A-6D illustrate different embodiments of blades 605 configured to facilitate aircraft capture, FIGS. 7A-7E illustrate an example time progression of capturing an aircraft using blade-tip facilitated capture, and FIG. 8 illustrates an embodiment of a method of operation for blade-tip facilitated capture of an aircraft.

Turning first to FIGS. 6A-6D, different embodiments of blades 605 are depicted. Each of FIGS. 6A-6D illustrate a different embodiment of blade 605, each blade 605 having a different contour. As used herein, a contour of a blade 605 refers to the outline or shape of blade 605. Additionally, blades 605 may include one or more leading edges 615a and trailing edges 615b. As used herein, a leading edge 615a may refer to an edge of blade 605 that is configured to contact payload line 130 before the trailing edge 615b. As depicted in FIGS. 6A-6D, each blade 605 includes two leading edges 615a and two trailing edges 615b, wherein the distal portions of blade 605 include leading edges 615a and the proximal portions of blade 605 (portions of blade 605 nearest hub 610) include trailing edges 615b.

In some embodiments, the contour of blade 605 defines one or more features 620 that may be configured to hook payload line 130. Feature 620 may be a protrusion 620a in some embodiments. In other embodiments, feature 620 may be an indention 620b. As used herein, a protrusion 620a may refer to a first portion of blade 605 that projects outward relative to a second portion of blade 605 (e.g., portion of blade 605 that includes trailing edge 615b) and an indention 620b may refer to a first portion of blade 605 that recesses inwardly relative to the second portion of blade 605. In some embodiments, blades 605 couple to a hub 610 of aerial vehicle.

In some embodiments, feature 620 is located at or near the leading edge 615a of blade 605. In some embodiments, blade 605 includes only a single type of feature 620 (e.g., blade 605 of FIGS. 6C-6D). In other embodiments, blade 605 has more than one type of feature 605 (e.g., blade 605 of FIGS. 6A-6B). Blade 605 may include one or more features 620. For example, blade 605 of FIGS. 6A and 6B include four features 620: two protrusions 620a (a protrusion 620a on each distal portion of blade 605) and two indentions 620b (an indention 620b on each proximal portion of blade 605). As another example, blade 605 of FIGS. 6C and 6D include two features 620: blade 605 of FIG. 6C includes two protrusions 620a and blade 605 of FIG. 6D includes two indentions 620b.

In some embodiments, blade 605 is coupled to a hub 610 of an aerial vehicle. As used herein, hub 610 refers to a central part of the aerial vehicle from which one or more blades 205 radiate. As depicted in FIGS. 6A-6D, each blade 205 coupled to hub 610 is a single continuous component. This disclosure also recognizes that each blade 205 depicted in FIGS. 6A-6D may be two or more separate components. For example, this disclosure recognizes that blade 605 of FIG. 6A may be divided into two halves (e.g., blade 605a and 605b (not depicted)) and each half may couple to hub 610. In such an embodiment, one end of blade 605 may include a leading edge 615a and the other end of blade 605 may include a trailing edge 615b. Additionally, in such an embodiment, blade 605 may include one or more features 620 (e.g., a protrusion 620a and/or an indention 620b). In some embodiments, features 620 are located at or near leading edge 615a.

Features 620 may be formed from rounded edges or angles (e.g., protrusions 620a and indentions 620b of FIGS. 6A and 6B) in some embodiments. In other embodiments, features 620 may be formed from straight edges or angles (e.g., protrusions 620a and indentions 620b of FIGS. 6C and 6D). Although this disclosure describes and depicts specific types of features 620 and specific contours that form features 620, this disclosure recognizes blades 605 may include any suitable feature 620 formed from any suitable contour.

Additionally, this disclosure recognizes that blade 605 may be a separate component that can couple to a pre-existing wing of an aerial vehicle. For example, blade 605 may be a component configured to snap on or over one or more pre-existing wings of an off-the-shelf quadcopter or other aerial vehicle. In such an example, blade 605 may provide an off-the-shelf aerial vehicle with blades having a contour permitting blade-tip facilitated retrieval.

Figure 7A:
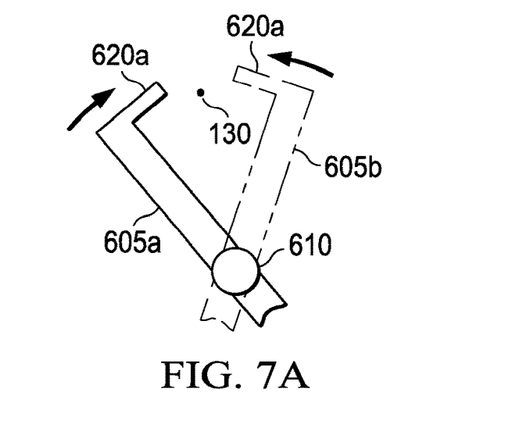
FIGS. 7A-7E illustrate an example of a time progression of blade-tip facilitated capture of an aircraft by the winch system FIG. 2, according to one embodiment.
Figure 7B:
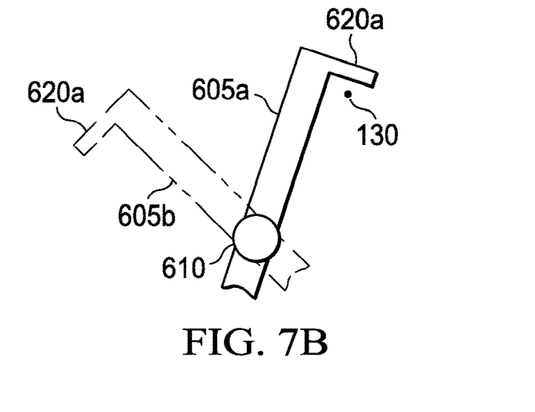
Figure 7C:
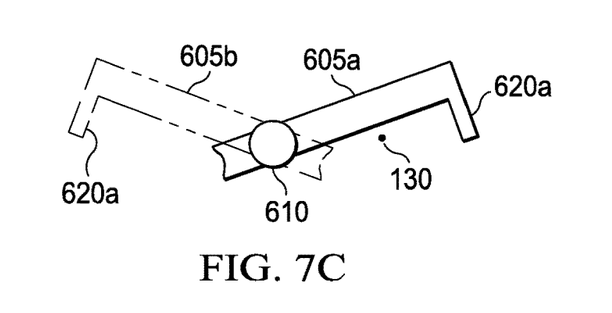
Figure 7D:
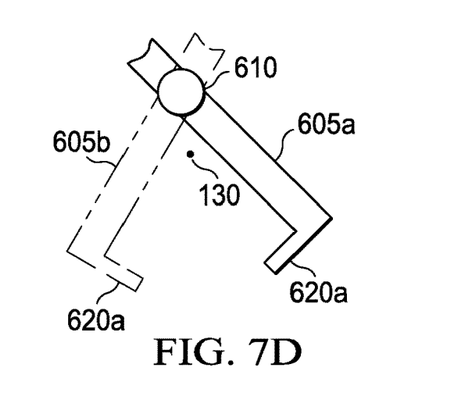
Figure 7E:
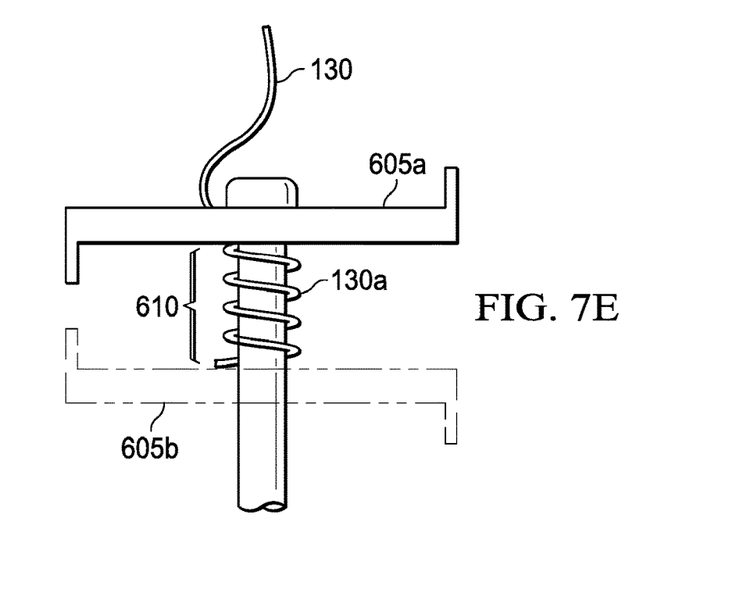
Figure 8:
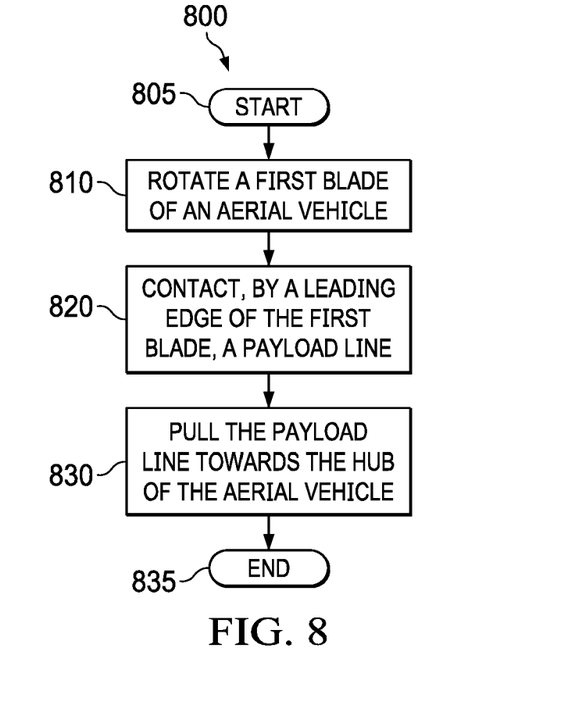
FIG. 8 illustrates a method of operation for blade-tip facilitated capture of an aircraft, according to one embodiment.

Turning now to FIGS. 7A-7E, these figures illustrate an example of stages or phases that may occur when capturing an aerial vehicle using blade-tip facilitated capture. FIGS. 7A-7D illustrate a top view of an aerial vehicle approaching and interacting with payload line 130 while FIG. 7E illustrates a side view of the aerial vehicle entangled by payload line 130.

FIG. 7A illustrates an aerial vehicle having blades 605 and hub 610. As illustrated in FIG. 7A, the aerial vehicle has two blades: first blade 605a and second blade 605b. In some embodiments, first blade 605a may be positioned superior to (in space) second blade 605b such that blades 605a-b cannot collide with each other when they are being rotated. In embodiments with more than one blade 605, blades 605 may be counter-rotating (rotating in opposite directions) such as described in reference to the weight-shifting coaxial helicopter of U.S. application Ser. No. 15/085,540. As depicted in FIG. 7A, blade 605a rotates in a first direction while blade 605b rotates in a second direction. In other embodiments with more than one blade 605, blades 605 may be co-rotating (rotating in the same direction). Although this disclosure describes and depicts an embodiment of an aerial vehicle having two blades 605, this disclosure recognizes that an aerial vehicle to be captured may include any suitable number of blades 605 (e.g., one, three, four, six). In some embodiments, blades 605 are fixed-pitch blades. In other embodiments, blades 605 are collective-pitch blades.

In FIG. 7A, one or more of counter-rotating blades 605 approach, or otherwise come within reach of, payload line 130. As depicted in FIGS. 7A-7E, blades 605 have a contour that is configured to facilitate entanglement of the aerial vehicle in payload line 130. Notably, in FIGS. 7A-7E, blades 605 include a protrusion feature 620a on the leading edge 615a of blades 605. FIG. 7B illustrates a phase at which protrusion feature 620a of blade 605a configured to hook payload line 130. In some embodiments, protrusion feature 620a of blade 605a prevents payload line from sliding off the distal end of blade 605a due to the contour of leading edge 615a. FIGS. 7C and 7d illustrate phases at which payload line 130 traverses along blade 605a, from leading edge 615a to trailing edge 615b, towards hub 610. In some embodiments, payload line 130 moves along blade 605 towards trailing edge 615b as blade 605 continues to rotate.

Rotating blade 605 may cause payload line 130 to wrap around hub 610 as depicted in FIG. 7E. Continued wrapping of payload line 130 around hub 610 may result in entanglement of payload line 130 around hub 610. Entanglement may occur after the pulling-in force on payload line 130 exceeds the tension force on payload line 130. In some embodiments, payload line 130 wraps around hub 610 between first blade 605a and second blade 605b. This disclosure recognizes that entangling around this portion of the aerial vehicle may prevent damage to payload line 130 and/or motors and/or shaft of the aerial vehicle. The aerial vehicle may be captured whenever payload line 130 is sufficiently wrapped around aerial vehicle such that the aerial vehicle can be reeled in by winch system 120.

Although not depicted, this disclosure also recognizes that second blade 605b may also hook payload line 130 and cause payload line 130 to wrap around hub 610 of the aerial vehicle. Accordingly, this disclosure recognizes that second blade 605b may be operated in a way that facilitates cooperation with first blade 605a to entangle payload line 130 around hub 610. This disclosure also recognizes that one or more features 620 of one or more blades 605 may hook payload line 130. In such scenario, payload line 130 may move across the one or more blades 605 from leading edge 615a to trailing edge 615b towards hub 610, before payload line 130 becomes entangled around hub 610.

This disclosure also recognizes that blade-facilitated capture may be performed by an aerial vehicle having only a single blade 605. In such embodiment, feature 620 of blade 605 may hook payload line 130 and draw payload line 130 towards hub 610 across blade 605. The continued rotation of blade 605 may cause payload line 130 to wrap around hub 610 of the aerial vehicle. Because it may be more difficult to cause payload line 130 to wrap around hub 610 with only one blade 605, this disclosure recognizes that the blade rotation speed of an aerial vehicle having a single blade 605 may be greater than the blade rotation speed of an aerial vehicle having more than one blade 605.

FIG. 8 illustrates a method 800 of capturing an aerial vehicle using blade-tip facilitated capture. One or more steps of method 800 may be performed by a controller of the aerial vehicle. A controller operable to perform one or more steps of method 800 may be a computer such as computer 900 of FIG. 9. Method 800 may be stored in a memory of controller (e.g., memory 920 of FIG. 9).

Method 800 may begin at step 805 and continue to step 810. At step 810, aerial vehicle may rotate a first blade (e.g., 605a) of the aerial vehicle. In some embodiments, a controller of the aerial vehicle causes first blade 605a to rotate (e.g., by sending instructions to a motor coupled to a rotor, which in turn may be coupled to first blade 605a). First blade 605a may be coupled to hub 610 and may have a contour configured to facilitate entanglement of payload line 130 of winch system 120 around the aerial vehicle as described above in reference to FIGS. 6A-6D. In some embodiments, method 800 continues to step 820 after rotating first blade 605a.

At step 820, the aerial vehicle contacts payload line 130 of winch system 120. In some embodiments, the portion of aerial vehicle that contacts payload line 130 is leading edge 615a of blade 605. Leading edge 615a may, in some embodiments, include one or more features 620. As described above, features 620 may be, in some embodiments, protrusions 620a and/or indentions 620b. In some embodiments, method 800 continues to step 830.

At step 830, payload line 130 is pulled towards the hub 610 of the aerial vehicle. In some embodiments, payload line 130 is pulled towards hub 610 of the aerial vehicle due to the pulling-in force exerted on payload line 130 by first blade 605a due to the continued rotation of first blade 605a. Payload line 130 may traverse leading edge 615a and trailing edge 615b while being pulled towards hub 610. In some embodiments, continued rotation of first blade 605a causes payload line 130 to become tangled around hub 610 of the aerial vehicle. Entanglement may occur when the pulling-in force exerted on payload line 130 exceeds the tension force on payload line 130. In some embodiments, method 800 continues to an end step 835 after payload line 130 is entangled around hub 610.

In some embodiments, method 800 may include one or more steps. For example, method 800 may continue from step 830 to a retrieval step that may be executed by airborne payload system 100. At such step, controllers 150 may instruct winch system 120 to reel in payload line 130 such that the aerial vehicle may be delivered to aircraft 110. Payload line 130 may thereafter be unwound from hub 610 in order to ready the aerial vehicle for future use.

Figure 9:
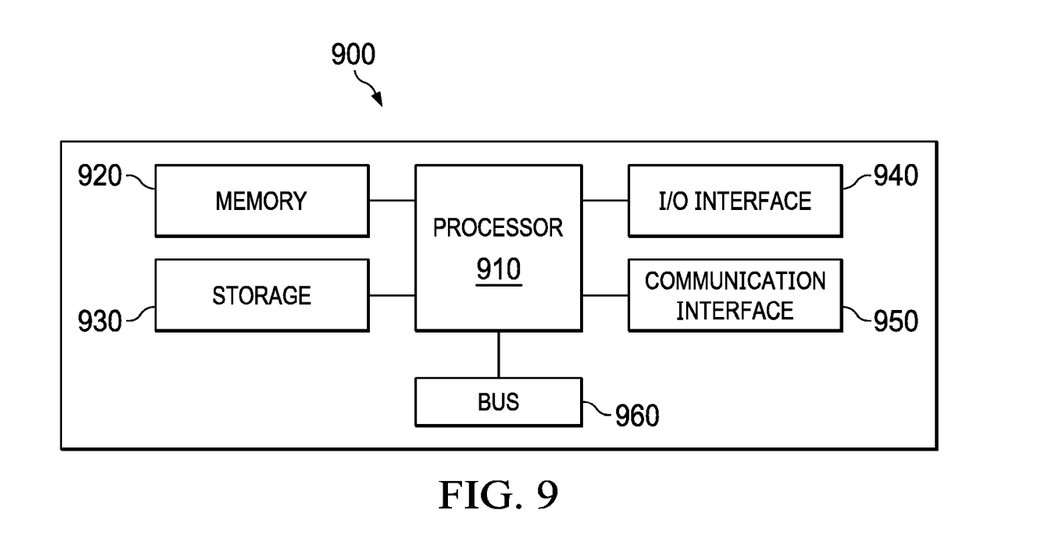
FIG. 9 illustrates an example computer system that may be included in a controller of the airborne payload control system of FIG. 1, according to certain embodiments.

FIG. 9 illustrates an example computer system 900. Computer system 900 may be utilized by airborne payload control system 100 of FIG. 1. For example, controller 150 of FIG. 1 may be a computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 910, memory 920, storage 930, an input/output (I/O) interface 940, a communication interface 950, and a bus 960. Although this disclosure describes and illustrates a particular computer system having a particular number of particular components in a particular arrangement, this disclosure contemplates any suitable computer system having any suitable number of any suitable components in any suitable arrangement.

In particular embodiments, processor 910 includes hardware for executing instructions, such as those making up a computer program. As an example and not by way of limitation, to execute instructions, processor 910 may retrieve (or fetch) the instructions from an internal register, an internal cache, memory 920, or storage 930; decode and execute them; and then write one or more results to an internal register, an internal cache, memory 920, or storage 930. In particular embodiments, processor 910 may include one or more internal caches for data, instructions, or addresses. This disclosure contemplates processor 910 including any suitable number of any suitable internal caches, where appropriate. As an example and not by way of limitation, processor 910 may include one or more instruction caches, one or more data caches, and one or more translation lookaside buffers (TLBs). Instructions in the instruction caches may be copies of instructions in memory 920 or storage 930, and the instruction caches may speed up retrieval of those instructions by processor 910. Data in the data caches may be copies of data in memory 920 or storage 930 for instructions executing at processor 910 to operate on; the results of previous instructions executed at processor 910 for access by subsequent instructions executing at processor 910 or for writing to memory 920 or storage 930; or other suitable data. The data caches may speed up read or write operations by processor 910. The TLBs may speed up virtual-address translation for processor 910. In particular embodiments, processor 910 may include one or more internal registers for data, instructions, or addresses. This disclosure contemplates processor 910 including any suitable number of any suitable internal registers, where appropriate. Where appropriate, processor 910 may include one or more arithmetic logic units (ALUs); be a multi-core processor; or include one or more processors 910. Although this disclosure describes and illustrates a particular processor, this disclosure contemplates any suitable processor.

In particular embodiments, memory 920 includes main memory for storing instructions for processor 910 to execute or data for processor 910 to operate on. As an example and not by way of limitation, computer system 900 may load instructions from storage 930 or another source (such as, for example, another computer system 900) to memory 920. Processor 910 may then load the instructions from memory 920 to an internal register or internal cache. To execute the instructions, processor 910 may retrieve the instructions from the internal register or internal cache and decode them. During or after execution of the instructions, processor 910 may write one or more results (which may be intermediate or final results) to the internal register or internal cache. Processor 910 may then write one or more of those results to memory 920. In particular embodiments, processor 910 executes only instructions in one or more internal registers or internal caches or in memory 920 (as opposed to storage 930 or elsewhere) and operates only on data in one or more internal registers or internal caches or in memory 920 (as opposed to storage 930 or elsewhere). One or more memory buses (which may each include an address bus and a data bus) may couple processor 910 to memory 920. Bus 960 may include one or more memory buses, as described below. In particular embodiments, one or more memory management units (MMUs) reside between processor 910 and memory 920 and facilitate accesses to memory 920 requested by processor 910. In particular embodiments, memory 920 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 920 may include one or more memories 920, where appropriate. Although this disclosure describes and illustrates particular memory, this disclosure contemplates any suitable memory.

In particular embodiments, storage 930 includes mass storage for data or instructions. As an example and not by way of limitation, storage 930 may include a hard disk drive (HDD), a floppy disk drive, flash memory, an optical disc, a magneto-optical disc, magnetic tape, or a Universal Serial Bus (USB) drive or a combination of two or more of these. Storage 930 may include removable or non-removable (or fixed) media, where appropriate. Storage 930 may be internal or external to computer system 900, where appropriate. In particular embodiments, storage 930 is non-volatile, solid-state memory. In particular embodiments, storage 930 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 930 taking any suitable physical form. Storage 930 may include one or more storage control units facilitating communication between processor 910 and storage 930, where appropriate. Where appropriate, storage 930 may include one or more storages 930. Although this disclosure describes and illustrates particular storage, this disclosure contemplates any suitable storage.

In particular embodiments, I/O interface 940 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 940 for them. Where appropriate, I/O interface 940 may include one or more device or software drivers enabling processor 910 to drive one or more of these I/O devices. I/O interface 940 may include one or more I/O interfaces 940, where appropriate. Although this disclosure describes and illustrates a particular I/O interface, this disclosure contemplates any suitable I/O interface.

In particular embodiments, communication interface 950 includes hardware, software, or both providing one or more interfaces for communication (such as, for example, packet-based communication) between computer system 900 and one or more other computer systems 900 or one or more networks. As an example and not by way of limitation, communication interface 950 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 950 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 950 for any of these networks, where appropriate. Communication interface 950 may include one or more communication interfaces 910, where appropriate. Although this disclosure describes and illustrates a particular communication interface, this disclosure contemplates any suitable communication interface.

In particular embodiments, bus 960 includes hardware, software, or both coupling components of computer system 900 to each other. As an example and not by way of limitation, bus 960 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 960 may include one or more buses 712, where appropriate. Although this disclosure describes and illustrates a particular bus, this disclosure contemplates any suitable bus or interconnect.

The components of computer system 900 may be integrated or separated. In some embodiments, components of computer system 900 may each be housed within a single chassis. The operations of computer system 900 may be performed by more, fewer, or other components. Additionally, operations of computer system 900 may be performed using any suitable logic that may include software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An aerial vehicle comprising:
    a propulsion system comprising one or more rotors, each of the one or more rotors comprising one or more blades, wherein:
        each blade is coupled to a hub of its respective rotor;
        each blade has a contour configured to facilitate entanglement of the aerial vehicle in a line of a winch system;
        each blade of the aerial vehicle has a leading edge and a trailing edge, the leading edge configured to contact the payload line before the trailing edge contacts the payload line; and
        the contour of each blade defines a feature towards the leading edge, the feature configured to hook the payload line, the feature being one or more of:
            an indentation; and
            a protrusion.

2. The aerial vehicle of claim 1, wherein at least one blade of the aerial vehicle is counter-rotating to another blade of the aerial vehicle.

3. The aerial vehicle of claim 1, wherein:
    the aerial vehicle comprises at least one pre-existing wing and each blade is configured to couple to the at least one pre-existing wing.

4. The aerial vehicle of claim 1, wherein the line of the winch system is pulled across the trailing edge of the blade towards its respective hub.

5. The aerial vehicle of claim 1, wherein entanglement occurs after a pulling-in force on the line exceeds a tension force on the line.

6. The aerial vehicle of claim 1, wherein each blade of the aerial vehicle is a fixed-pitch blade.

7. A system for capturing an airborne payload comprising:
    a payload line comprising a first end and a second end, the second end of the payload line configured to couple to a payload;
    a winch system operable to spool the payload line, the winch system comprising a main reel about which the first end of the payload line is wound; and
    wherein the payload is an aerial vehicle comprising one or more rotors, each of the one or more rotors comprising one or more blades, wherein:
        each blade is coupled to a hub of its respective rotor;
        each blade has a contour configured to facilitate entanglement of the payload line around the aerial vehicle;
        each blade of the aerial vehicle has a leading edge and a trailing edge, the leading edge configured to contact the payload line before the trailing edge contacts the payload line; and
        the contour of each blade defines a feature towards the leading edge, the feature configured to hook the payload line, the feature being one or more of:
            an indentation; and
            a protrusion.

8. The system of claim 7, wherein at least one blade of the aerial vehicle is counter-rotating to another blade of the aerial vehicle.

9. The system of claim 7, wherein the payload line is pulled across the trailing edge of the blade towards its respective hub.

10. The system of claim 7, wherein entanglement occurs after a pulling-in force on the payload line exceeds a tension force on the payload line.

11. An aerial vehicle comprising:
a fuselage; and
a propulsion system comprising one or more rotors, each of the one or more rotors comprising one or more blades, wherein:
 each blade is coupled to a hub of its respective rotor;
 each blade has a contour configured to facilitate entanglement of the aerial vehicle in a line of a winch system;
 each blade of the aerial vehicle has a leading edge and a trailing edge, the leading edge configured to contact the payload line before the trailing edge contacts the payload line; and
 the contour of each blade defines a feature towards the leading edge, the feature configured to hook the payload line, the feature being one or more of:
  an indentation; and
  a protrusion.

12. The aerial vehicle of claim 11, wherein at least one blade of the aerial vehicle is counter-rotating to another blade of the aerial vehicle.

13. The aerial vehicle of claim 11, wherein the aerial vehicle comprises at least one pre-existing wing and each blade is configured to couple to the at least one pre-existing wing.

14. The aerial vehicle of claim 11, wherein the line of the winch system is pulled across the trailing edge of the blade towards its respective hub.

15. The aerial vehicle of claim 11, wherein entanglement occurs after a pulling-in force on the line exceeds a tension force on the line.

* * * * *